UNITED STATES PATENT OFFICE.

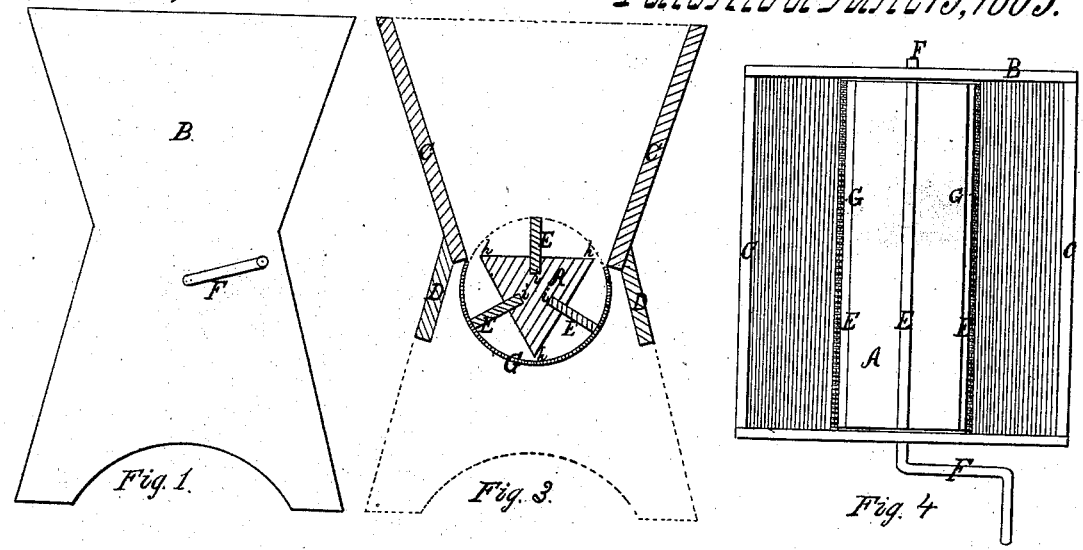
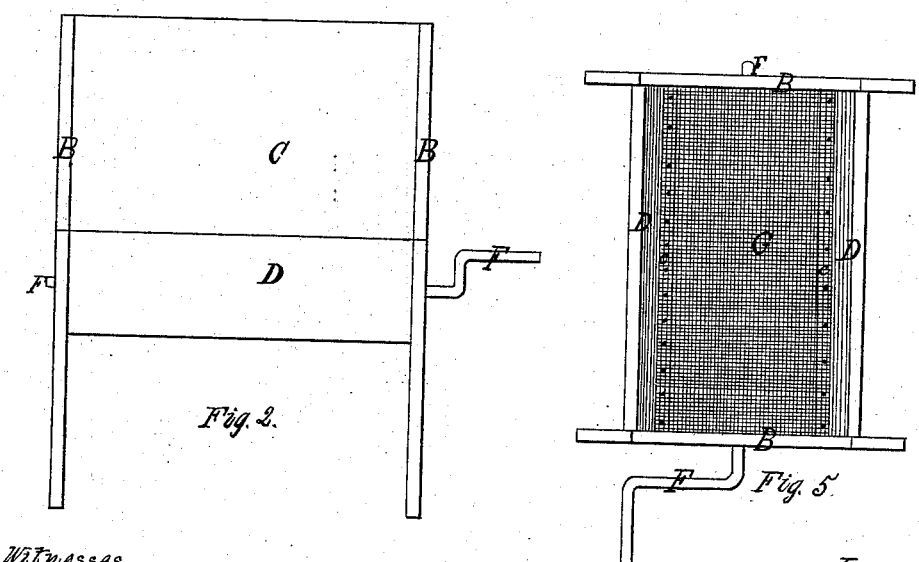

JOSEPH H. LITTLEFIELD, OF CAMBRIDGE, MASSACHUSETTS.

IMPROVED FLOUR-SIFTER.

Specification forming part of Letters Patent No. 48,189, dated June 13, 1865.

*To all whom it may concern:*

Be it known that I, JOSEPH H. LITTLEFIELD, of Cambridge, in the county of Middlesex and State of Massachusetts, have invented certain new and useful Improvements in Flour-Sifters; and I do hereby declare the following to be a full and exact description of the same, reference being had to the accompanying drawings, forming a part of this specification, in which—

Figure 1 is an end elevation. Fig. 2 is a side elevation. Fig. 3 is a transverse sectional view. Fig. 4 is a top view, looking down upon the shaft. Fig. 5 is a bottom view, showing the sieve from below.

Letter A represents an equilateral-triangular shaft; B B, ends of the case that sustains the shaft A; C C, sides of the said case; D D, two narrow strips attached to the lower edges of the sides C C, and, extending downward, serve to prevent the flour from flying off from the sides of the sieve. E E E are strips of some elastic substance, to press the flour through the sieve G; F, the crank by which the shaft A is revolved; G, the sieve; $h\ h\ h$, angles of the shaft A; $i\ i\ i$, grooves running longitudinally along the center of the planes of the shaft A, and are to receive one edge of the strips E E E.

The same letters represent corresponding parts in the different figures.

To enable others skilled in the art to make and use my invention, I will describe its construction and mode of operation.

The general structure of the case B, C, and D will be readily understood by an examination of the drawings.

The sieve G, I make of wire-cloth or perforated tin, and cut it, so that when put in its place between the two ends B B, and having a cylindrical form imparted to it, is attached to the lower edges of the sides C C, as seen in Fig. 3.

The shaft A, I make triangular, and in size such that it shall fall somewhat short of filling the circle of the sieve.

The strips E E E are made of rubber, leather, or their equivalent, and are nailed into the grooves $i\ i\ i$, and are in width such as to cause their outer edges to describe a circle of the same diameter as the circle of which the sieve forms a part.

The advantages gained by this form of the shaft A and this arrangement of the strips E E E are as follows: The corners $h\ h\ h$ of the shaft A, reaching nearly to the sieve and being unyielding, force much of the flour through the interstices of the sieve more promptly than a yielding substance would, while the elastic strips, following immediately after, keep the interstices of the sieve clean.

It will be readily seen in examining Fig. 3 that this structure of the shaft and the manner of attaching the strips E E E give capacity to the machine to work equally well whichever way the shaft A is revolved—a consideration of great importance, as the person using it will be likely to turn it in either direction.

Now, what I claim as my invention, and desire to secure by Letters Patent, is—

The arrangement and combination of the case B B C C, sieve G, the two side pieces, D D, and the equilateral-triangular shaft A, or its equivalent, provided with the grooves $i\ i\ i$, and the elastic strips E E E, substantially as described, and for the purpose set forth.

JOSEPH H. LITTLEFIELD.

Witnesses:
JABEZ A. SAWYER,
BENJ. DEAN.